United States Patent [19]

Stockman

[11] Patent Number: 4,544,426
[45] Date of Patent: Oct. 1, 1985

[54] METHOD AND APPARATUS FOR APPLYING A COATING MATERIAL TO A PIPE

[75] Inventor: James J. Stockman, Calgary, Canada

[73] Assignee: Shaw Industries Ltd., Toronto, Canada

[21] Appl. No.: 544,533

[22] Filed: Oct. 24, 1983

[51] Int. Cl.$^4$ ............................................. B65H 81/00
[52] U.S. Cl. ................................... 156/73.6; 156/187; 156/428; 156/429; 156/446; 156/195
[58] Field of Search ............... 156/187, 188, 446, 155, 156/392, 191, 195, 428, 429, 425, 73.6; 118/321, 320

[56] References Cited

U.S. PATENT DOCUMENTS

| | | | |
|---|---|---|---|
| 1,736,911 | 11/1929 | Gray | 156/187 |
| 1,961,974 | 6/1934 | Kraner | 156/195 |
| 2,037,043 | 4/1936 | Postlewaite | 156/187 |
| 2,269,032 | 1/1942 | Moore | 156/187 X |
| 3,563,825 | 2/1971 | Segura et al. | 156/392 X |
| 3,740,291 | 6/1973 | Mallard | 156/392 |
| 3,817,813 | 6/1974 | Keith et al. | 156/392 X |
| 4,006,049 | 2/1977 | Gardner | 156/195 |
| 4,333,783 | 6/1982 | Gardner | 156/187 |

FOREIGN PATENT DOCUMENTS

5702/32  1/1932  Australia ............................. 156/187

*Primary Examiner*—David Simmons

[57] ABSTRACT

The invention relates to a method and apparatus for wrapping pipe with a cementatious material wherein the wrapping strip is provided with notches along the edges thereof which interlock along the wrapping seam about the pipe to provide an even coating. Where reinforcing mesh is provided within the coating material the mesh also overlaps at the wrapping seam to give greater strength to the coating. Compacting of the coating material is accomplished after the pipe is wrapped by means of a vibrating shoe.

14 Claims, 6 Drawing Figures

METHOD AND APPARATUS FOR APPLYING A COATING MATERIAL TO A PIPE

The present invention relates to an apparatus for applying a coating material to a pipe wherein the coating material is first applied in an even layer to a carrier tape which is then wrapped spirally about the pipe. The coating material may be a cementatious material such as concrete or it may be a thermoplastic material or other suitable coating material. The apparatus is provided with means for effecting a continuous interlocking overlapping of the coating strip as it is applied to the pipe. This type of overlapping ensures that the coating material is applied evenly and concentrically about the pipe, and when one or more strips of reinforcing mesh are provided within the coating material layer, this continuous overlap provides uniform mesh reinforcement along the full length of the coated pipe with a positive overlap of the mesh at the wrapping seam.

Concrete coated pipe is commonly used in underwater applications for oil and gas transmission, and such coating for the most part is used to give the pipe negative buoyancy. Clearly, the concrete coating can also serve to protect the pipe from other external hazards and for this reason is sometimes used to give physical protection to a span of exposed pipe.

It is important that the coating applied to the pipe be continuous and of an even thickness so that the desired weighting of the pipe is obtained and so that the coating once applied will be resistant to deterioration. Most prior wrapping devices make no provision for the positive overlap of the concrete layer as it is being applied to the pipe. Sometimes provision is made for the overlap of the concrete layer as it is being applied to the pipe, and sometimes provision is made for the overlap of the carrier tape, but more often reliance is placed on the use of a concrete mixture having sufficient plasticity to flow under compression applied during wrapping to fill in the wrapping seam. It has also been suggested to simply overlap the coated tape during the wrapping process and then to roll the seam to ensure even thickness and continuity of the concrete layer. Clearly, the concrete used for coating a pipe cannot be too plastic or the coating will be unacceptably susceptible to handling damage prior to setting.

Additionally, prior devices do not provide for the accurate positioning of a reinforcing mesh so that a concentric mesh reinforcement is achieved in the concrete layer wrapped about the pipe. This is especially critical when wrapping pipe of small diameter, i.e. in the 4 to 6 inch range. Also, when applying a thick concrete coating to a pipe, specifications often call for the use of two mesh layers for added reinforcement. The present apparatus is especially well suited to incorporate two mesh layers positioned in the concrete wrapping so that such reinforcement may be provided either concentrically coplanar or non-coplanar about the pipe with a positive overlap of both mesh layers at the wrapping seam. Previous devices were not capable of applying a coating having two reinforcing mesh layers wherein each mesh layer formed a positive overlap at the seam.

Prior devices have relied on compression of the coating during the wrapping process to compact the concrete and to fill in any gaps along the seam. Sometimes this compression wrapping technique is coupled with a vibrator, but generally the prior devices rely on the plasticity of the concrete being used to achieve the desired quality of the coating at the joint of the application of the wrapping to the pipes. The present device utilizes a fairly dry concrete mixture which is wrapped about the pipe and subsequently subjected to a compacting operation by means of a vibrating shoe. This procedure is superior to that previously employed because the drier concrete mixture is not as susceptible to damage prior to setting, and the reinforcing mesh is much less vulnerable to displacement from the desired position within the concrete layer.

Accordingly, the present invention provide an apparatus for wrapping pipe, comprising a conveyor means for rotating and advancing the pipe in relation to its longitudinal axis and a frame positionable at an angle with respect to the conveyor means. A main endless belt is supported by the frame upon which a continuous wrapping material is conveyed to the pipe. This wrapping material comprises a continuous carrier tape in contact with the main belt and a layer of coating material on the carrier tape in which may be positioned one or more continuous strips of a mesh reinforcing material. At least one endless notching belt is positioned on and near one edge of the main belt and is driven thereby. A roller is positioned above the belts having at least one notching disk for making at least one notch in the coating material opposite from the notch or notches made in the coating material by the notching belt or belts, so that said notches interlockingly overlap at the seam of the wrapped pipe. The roller is positioned to reduce the thickness of the coating material to that desired. A vibrating shoe is positioned about the wrapped pipe for compacting the coating material.

A preferred embodiment of the invention will hereinafter be described with reference being made to the drawings in which.

Figure 1:
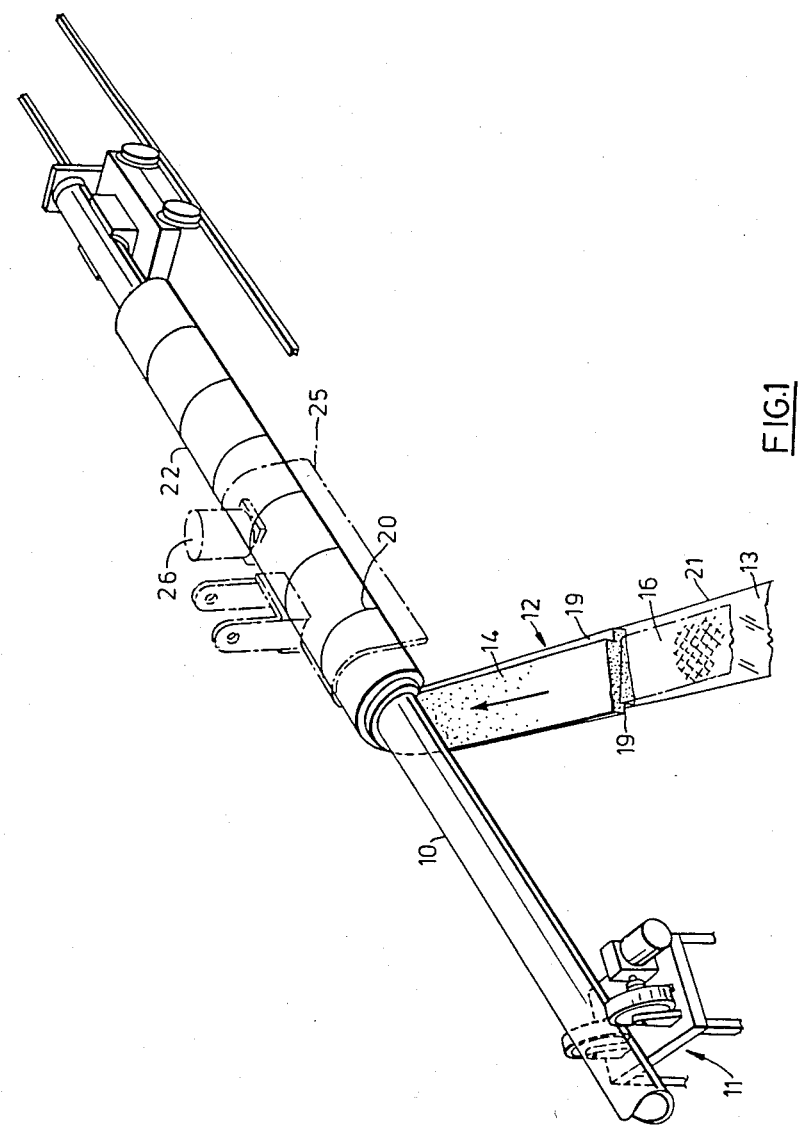
FIG. 1 is a perspective view of a pipe being wrapped with the interlocking coating produced by the apparatus of the invention.

Referring to FIG. 1, a pipe 10 is conveyed and rotated by conventional conveyor means 11, and the pipe 10 is wrapped spirally with a strip 12 of coating material advanced at an angle thereto also in a conventional fashion. The strip 12 comprises a carrier tape 13 upon which is applied a layer of coating material 14 preferably having at least one continuous strip of reinforcing mesh 16 embedded therein. The coating material 14 is preferably concrete having a low water content so that it will set rapidly and have low plasticity. The wrapping strip 12 can be wrapped uniformly about the pipe 10 in a fashion superior to that previously available by virtue of the notches 19 which are made in the coating material 14 along both edges of the strip 12 so that upon wrapping, the strip 12 overlaps with itself at a spiral seam 20 to ensure evenness of coating and continuity of the reinforcing mesh 16. In addition, the carrier tape 13 preferably has an uncoated edge 21 which forms an exterior overlap at the spiral seam 20.

As may also be seen from FIG. 1, the wrapped pipe 22 is contacted with a shoe 25 having a vibrator 26 which operates to smooth, compact and increase the density of the coating material 14 and to cause an intermingling of the coating material 14 at the seam 20. The shoe 25 is preferably made of steel and is curved to conform to the outside diameter of the wrapped pipe 22. However, each shoe 25 may be used over a range of diameters so a large number of shoes 25 are not required in order to cover a wide range of wrapping applications. When wrapping small diameter pipe, it is especially important to achieve the maximum density possible for the coating material 14 so that the required negative buoyancy can be obtained without excessively increasing the pipe diameter.

A low coefficient of friction is maintained between the contacting surfaces of the wrapped pipe 22 and the shoe 25 by virtue of the vibration of the shoe 25 and optionally by applying a light spray of water to the exterior of the wrapped pipe 22.

Figure 2:
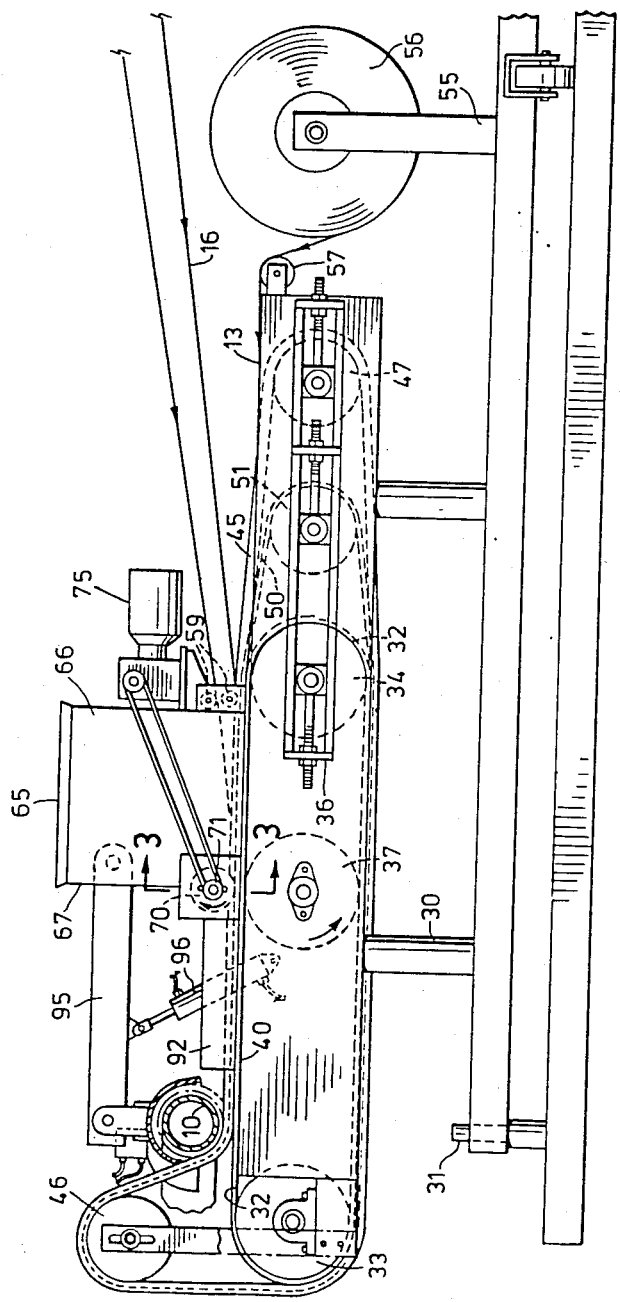
FIG. 2 is a side elevation of the apparatus of the invention.
Figure 4:
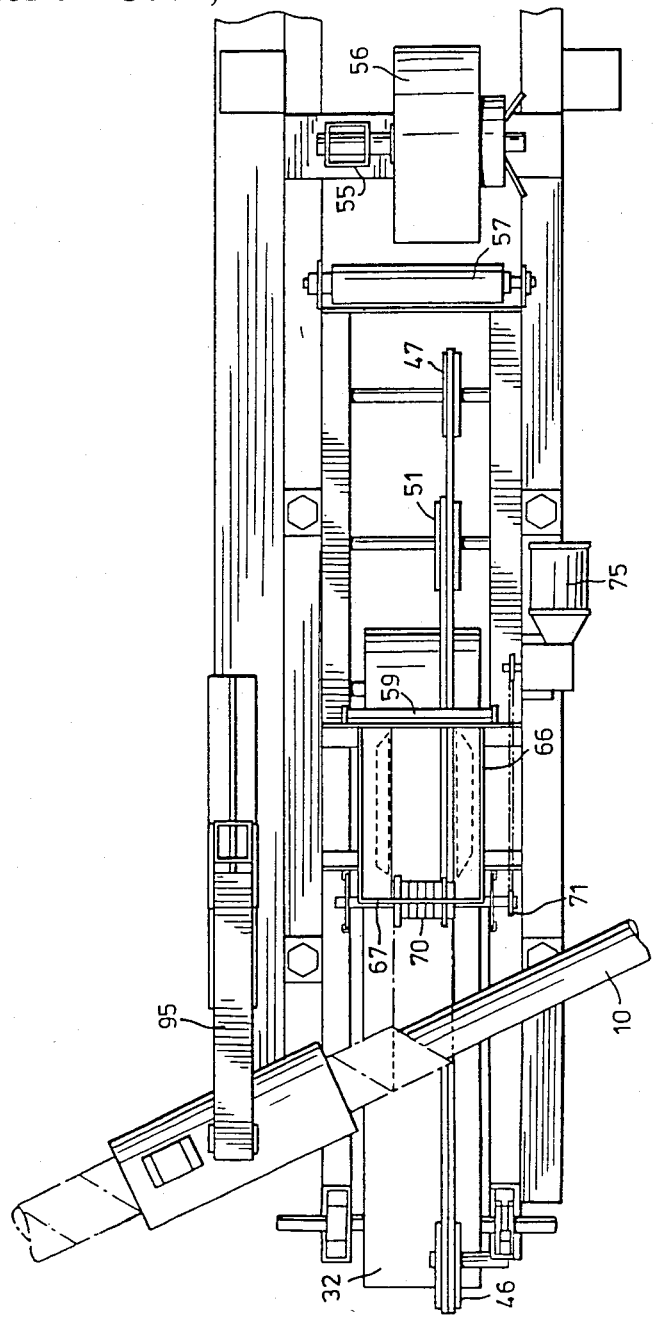
FIG. 4 is an overhead plan view of the apparatus.

The preferred pipe wrapping apparatus of the invention is shown in FIGS. 2 and 4. The apparatus comprises a frame 30 which is pivotable about a pin 31 so that the angle of application of the coating strip to the pipe 10 can be adjusted as conditions require.

Mounted on the frame 30 is a main endless belt 32 wrapped about a drive pulley 33 at the forward end of the apparatus and a rear pulley 34 which is freely rotatable and is mounted in an adjustable bracket 36 so that the belt 32 can be properly tensioned. A third freely rotatably pulley 37 is located between the drive pulley 33 and the rear pulley 34 for the purpose of supporting the belt 32 in the area beneath a roller 70 used to form the coating layer 14 just prior to wrapping. For most applications a main belt 32 having a 12 inch width is sufficient.

To support the belt 32 from sagging beneath the weight of the coating material 14, a slider bed 40 is attached to the frame 30 between the pulleys 33 and 34. This slider bed 40 comprises a chamber having a plurality of holes in its top surface through which is forced air to provide a slight air cushion for the belt 32.

Figure 3A:
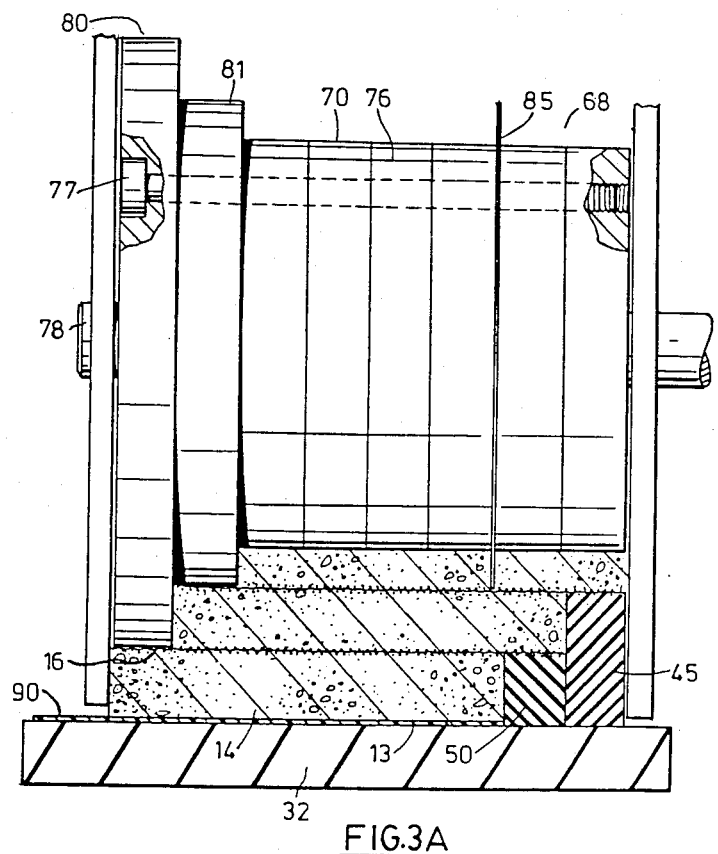
FIGS. 3A and 3B are views taken along section 3—3 of FIG. 2 showing details of two possible roller configurations for the apparatus.

At least one endless notching belt 45 is positioned near one edge of the main belt 32 and is supported thereon. The notching belt 45 is guided by means of a forward pulley 46 positioned above the drive pulley 33 and by means of a rearward pulley 47 which is adjustable in the bracket 36 for tensioning of the belt 45. Provision is also made for a second notching belt 50 which may be positioned just inside of the notching belt 45, i.e. toward the center of the main belt 32, or under the belt 45 to create a stepped notch in the coating material as shown in FIG. 3A. This second notching belt 50 when used in conjunction with the notching belt 45 is guided by the forward pulley 46 and by a rearward pulley 51 which is also adjustable in the bracket 36.

Located to the rear of the frame 30 is a first reel 55 for carrying a spool of carrier tape 56 which is fed over a guide roller 57 onto the main belt 32. The reel 55 is adjustable laterally (see FIG. 4) so that the tape 56 can be lined up properly adjacent the innermost notching belt either 45 or 50. To the rear and above the reel 55, additional reels (not shown) are provided for one or two spools of reinforcing mesh 16 which are initially positioned over the carrier tape 13 by means of guide rollers 59.

Coating material 14, preferably concrete, is applied to the carrier tape 13 through a hopper 65 attached to the frame 30 and located directly over the tape 13. The hopper 65 may have adjustable sides 66 to allow for varying widths for the coating strip 12. The front wall 67 of the hopper 65 has an aperture 68 through which the coated strip 12 passes on its way to the pipe 10.

Figure 5:
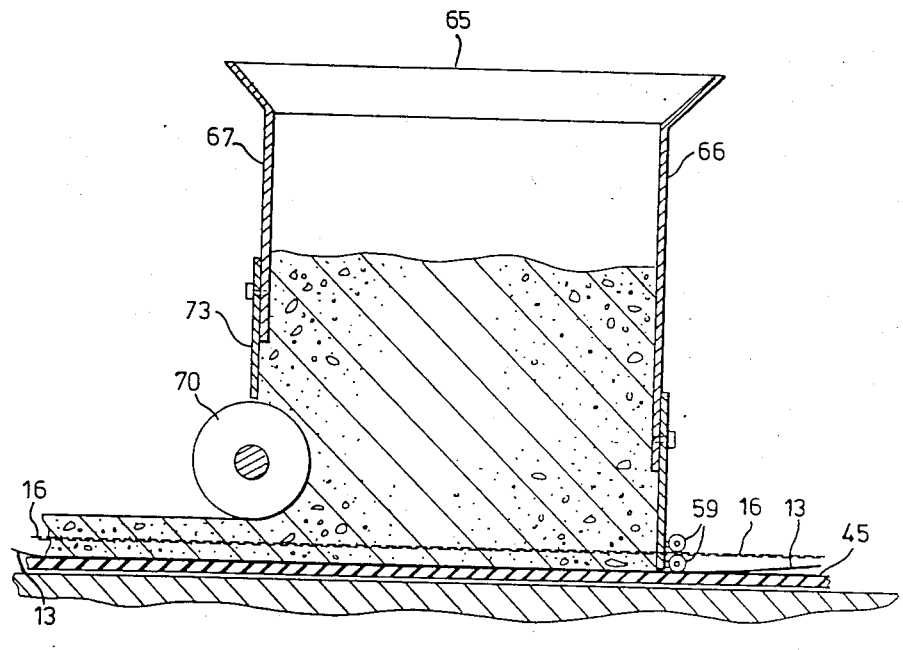
FIG. 5 is a cross section through the hopper showing details of the application of coating material to the carrier tape.

Positioned in the aperture 68 of the hopper 65 is a notch forming roller 70. The roller 70 is located directly over and rotates in a direction opposite to the pulley 37. The roller 70 is mounted in adjustable bearings 71 to accommodate various thicknesses for the coating material 14. The hopper 65 is provided with an adjustable gate 73 (see FIG. 5) located above the roller 70 to close off that upper portion of the aperture 68 not occupied by the roller 70. The roller 70 is driven by a motor 75 mounted on the frame 30.

Figure 3B:
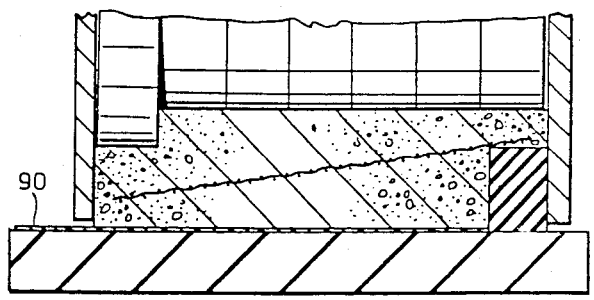

As seen from FIG. 3A, the roller 70 is constructed from a plurality of disks 76 which are joined together by bolts 77. The roller 70 is mounted on an axle 78 which is supported by the adjustable bearings 71. At the end of the roller 70 opposite from the notching belts 45 and 50 (FIG. 3A) are mounted two notching disks 80 and 81 which operate to notch the coating material 14 in a complementary fashion to the notching accomplished by the belts 45 and 50 so that the coating strip 12 interlocks at the seam 20 upon wrapping of the pipe 10 (FIG. 1). Also, a mesh positioning disk 85 may be added to the roller 70 to ensure the accurate placement of the reinforcing mesh 16 in the finished coating strip 12. The disk 85 is thin so as to minimize the disturbance to the coating material 14, but it is also rigid so that it can act in conjunction with the notching belt 45 to position the mesh 16 at the desired location in the coating material 14. Clearly, the positioning disk 85 is operational only with respect to the upper layer of mesh 16 in a dual mesh system as shown in FIG. 3A, or when only one layer of mesh 16 is used. The mesh 16 may be positioned horizontally in the coating material 14 (FIG. 3A) to give concentric reinforcement of the coating about the pipe 10, or the mesh 16 can be positioned on an angle (FIG. 3B) in the coating material 14 to give a non-coplanar reinforcement when wrapped about the pipe 10.

The operation of the apparatus for forming the coating strip 12 and wrapping the pipe 10 proceeds as follows. The carrier tape 13, which is preferably a plastic material, is fed from the spool 56 onto the main belt 32 with one edge of the tape 13 abutting the inner notching belt either 45 or 50 also riding on the main belt 32 (see FIGS. 3A and 3B). The tape 13 is fed through the hopper 65 with the edge 21 away from the notching belts 45 and 50 extending beyond the hopper wall 66 so that a margin of uncoated tape 90 (FIGS. 3A and 3B) is provided for overlapping the seam 20 of the wrapped pipe 22. The desired number of mesh strips 16 are fed from reels (not shown) through the guide rollers 59 into the hopper 65 where they are positioned within the layer of coating material 14 deposited from the hopper 65 onto the tape 13 by means of the initial guide rollers 59, the notching belts 45 and 50 and the roller 70 optionally equipped with the positioning disk 85. The notching belts 45 and 50 form notches in the coating material corresponding to their heights and widths, and the roller 70 makes corresponding notches in the coating material 14 diagonally opposite from the notches formed by the belts 45 and 50.

The formed coating strip 12 proceeds from the roller 70 between the conveyor side guards 92 to the pipe 10 where it is spirally wrapped about it so that the notches formed as aforesaid overlap and interlock with the tape margin 90 overlapping the formed seam 20. The notching belts 45 and 50 support the coating material 14 during approximately the first quarter turn of wrapping so that the integrity of the notches formed by the belts 45 and 50 is assured (see FIG. 2). This is achieved by the arrangement of the pulley 46 located at the front of the apparatus to guide the belts 45 and 50 during the wrapping portion of the operation.

The wrapped pipe 22 is immediately subjected to a finishing operation wherein the vibrating shoe 25 causes the coating material 14 to flow so as to fill in the seam 20 and other cracks and voids which may have developed up to that stage. As shown in FIG. 2, the shoe 25 is preferably mounted pivotally on the frame 30 by an arm 95 and may be positioned on the wrapped pipe 22 by a cylinder 96.

By wrapping the pipe 10 using the apparatus of the invention, an even layer of coating material is applied about the pipe 10 and the reinforcing mesh 16 is accurately positioned within the coating material 14 and overlaps at the seam 20 to give maximum strength to the coating.

I claim:

1. An apparatus for wrapping pipe comprising:
    conveyor means for rotating and advancing the pipe in relation to its longitudinal axis;
    a frame positionable at an angle with respect to the conveyor means;
    a main endless belt supported by the frame upon which a continuous wrapping material is conveyed to the pipe, said wrapping material comprising a continuous carrier tape in contact with the main belt and a layer of coating material on the carrier tape;
    at least one endless notching belt positioned on and near one edge of the main belt and which is driven thereby;
    a roller positioned above the belts and having at least one notching disk for making at least one notch in the coating material opposite from the notch or notches made in the coating material by the notching belt or belts, so that said notches interlockingly overlap at the seam of the wrapped pipe, said roller being positioned to reduce the thickness of the coating material to that desired; and
    a vibrating shoe positioned about the wrapped pipe for compacting the coating material.

2. An apparatus as claimed in claim 1, wherein the width of the carrier tape extends beyond the width of the coating material carried so as to overlap the seam of the wrapped pipe.

3. An apparatus as claimed in claim 1, wherein the coating material is concrete.

4. An apparatus as claimed in claim 1, further comprising at least one continuous strip of a mesh reinforcing material positioned in the coating material.

5. An apparatus as claimed in claim 1, wherein the number of notching belts is two.

6. An apparatus as claimed in claim 5, wherein the notching belts are located adjacent one another at different levels above the main belt.

7. An apparatus as claimed in claim 5, wherein the notching belts are located one on top of the other to provide a stepped notch in the coating material.

8. An apparatus as claimed in claim 1, wherein the roller has two adjacent notching disks of different diameters.

9. An apparatus as claimed in claim 4, further comprising a thin mesh positioning disk incorporated in the roller for cooperating with a notching belt to ensure accurate positioning of a mesh reinforcing strip within the coating layer.

10. An apparatus as claimed in claim 1, wherein the vibrating shoe is metal and is curved to conform to the outside diameter of the wrapped pipe.

11. An apparatus as claimed in claim 1, wherein the one or more notching belts maintain contact with the coating material during approximately the initial quarter turn about the pipe.

12. A method for wrapping pipe with a strip of coating material, comprising:
    rotating and advancing the pipe in relation to its longitudinal axis;
    conveying a continuous wrapping material to the pipe by means of a main endless belt supported by a frame positionable at an angle with respect to the rotating and advancing pipe, said wrapping material comprising a continuous carrier tape in contact with the main belt and a layer of coating material on the carrier tape;
    providing notching at the diagonally opposite edges of the coating strip by means of at least one endless notching belt positioned on and near one edge of the main belt and which is driven thereby, and by means of a roller positioned above the belts having at least one notching disk for making at least one notch in the coating material opposite from the notch or notches made in the coating material by the notching belt or belts, so that said notches provide an interlocking of the coating at the seam formed by wrapping the strip spirally about the pipe, said roller being positioned to reduce the thickness of the coating material to that desired; and
    vibrationally compacting the coating material immediately after the strip is wrapped about the pipe.

13. A method as claimed in claim 14, wherein the coating material has at least one strip of a continuous mesh reinforcing material positioned therein so that such reinforcing material overlaps at the seam, said notching belt or belts being positioned below the reinforcing mesh and said roller being positioned above the reinforcing mesh.

14. A method as claimed in claim 12, wherein the coating material is concrete.

* * * * *